Nov. 5, 1957  F. E. SILBAUGH  2,812,084
REMOVABLE HOISTING ATTACHMENT FOR TRACTORS
Filed July 26, 1954  2 Sheets-Sheet 1
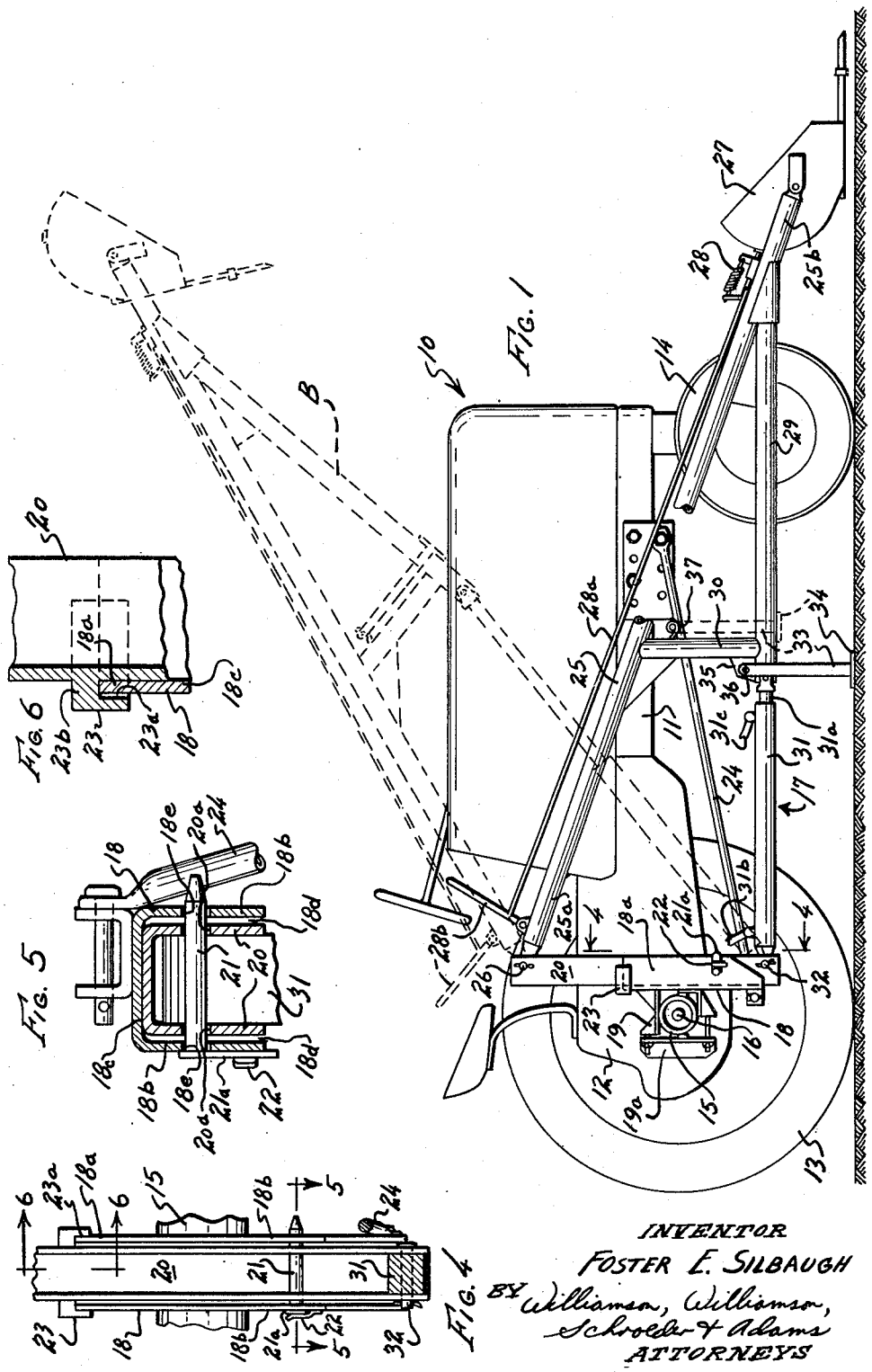
INVENTOR
FOSTER E. SILBAUGH
BY Williamson, Williamson,
Schroeder & Adams
ATTORNEYS

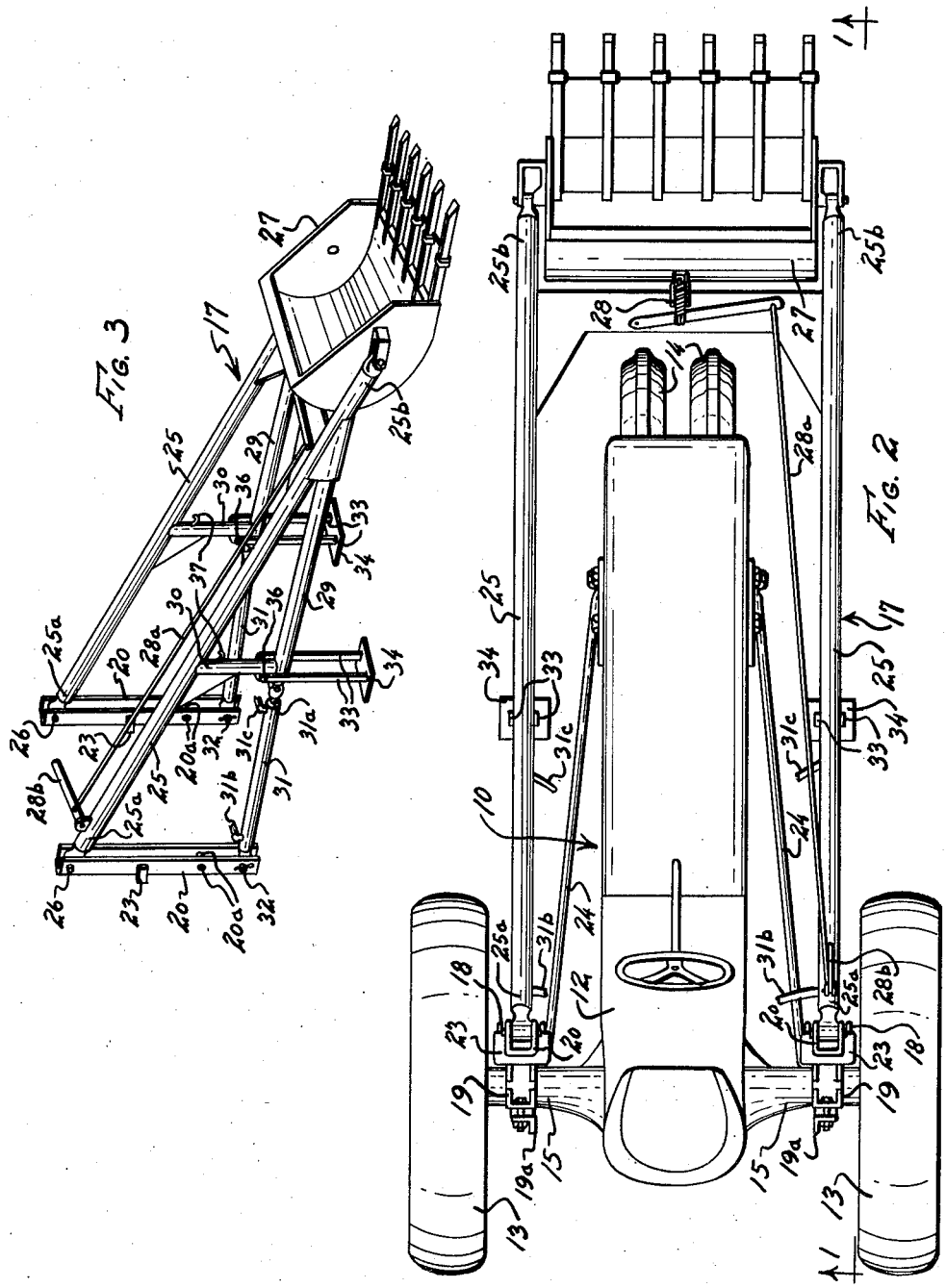

United States Patent Office 2,812,084
Patented Nov. 5, 1957

2,812,084

REMOVABLE HOISTING ATTACHMENT FOR TRACTORS

Foster E. Silbaugh, Humboldt, Iowa, assignor to Silbaugh Manufacturing Company, Humboldt, Iowa, a corporation of Iowa Application July 26, 1954, Serial No. 445,575

9 Claims. (Cl. 214—140)

This invention relates to hoisting equipment for use with power implements such as tractors, and more specifically relates to apparatus for attaching hoisting equipment to such power implements. Various types of apparatus and tools, such as equipment hoists, bucket type loaders, snow plows and bull dozer blades, are used with tractors as attachments. Frequently it is desirable to be able to attach such a tool to the tractor, use the attachment for a short period and then detach the tool again. One of the major disadvantages of using such tools in the past was the difficulty with which they were attached to and detached from the tractor. Often times several hours were required for attaching such tools to a tractor and a similar length of time was required to disconnect the attachment from the tractor.

A general object of my invention is to provide improved hoisting equipment, such as a bucket type loader for power implements, which is readily and easily attached to and detached from such implements.

Another object of my invention is to provide for use with a tractor, a novel hoisting attachment which is readily and easily attached to a tractor without the use of tools by merely aligning the tractor with the attachment and running the same into engagement with the attachment.

Still another object of my invention is to provide a new and improved hoisting attachment which is readily and easily detached from a tractor by supporting the attachment on a fulcrum and by utilizing the weight of a portion of such equipment in combination with the power from such a tractor to cause the attachment to tilt and disengage from the tractor.

These and other objects and advantages of my invention will more fully appear from the following description made in connection with the accompanying drawings wherein like reference characters refer to the same parts throughout the several views and in which:

Fig. 1 is a side elevation view of a tractor partly broken away and of my invention mounted thereon;

Fig. 2 is a plan view of a tractor having my invention mounted thereon;

Fig. 3 is a perspective view of a portion of my apparatus;

Fig. 4 is a detail view taken on a vertical plane substantially at 4—4 of Fig. 1;

Fig. 5 is a detail section view taken on a horizontal plane substantially at 5—5 of Fig. 4; and Fig. 6 is a detail section view taken on a vertical plane substantially at 6—6 of Fig. 4.

In the form shown in the accompanying drawings, my invention is shown mounted on a tractor 10 having a frame 11, a body portion 12, rear wheels 13, and front wheels 14. Rear axle housing 15, which carries the axle 16 for rear wheels 13, comprises a portion of frame 11 for supporting the body portion 12 of the tractor.

The hoisting equipment 17 which comprises an attachment for tractor 10, includes a pair of upstanding support members 18, each of which has an upper end portion 18a and each of which comprises a channel member having spaced apart side walls 18b and a rear wall 18c. Channel member 18 defines a forwardly opening interior chamber 18d. A pair of aligned apertures 18e are provided in sidewalls 18b thereof. The upwardly protruding end portion 18a comprises an insert element as a portion of the securing means mounted on tractor 10.

A mounting bracket 19 is attached to each of the channel members 18 by suitable means such as welding to the rear wall 18c thereof. Bracket 19 includes a retaining member 19a which is bolted thereto and which engages the axle housing 15 for retaining the bracket 19 and channel member 18 thereon.

A tie bar 24 is secured at one end thereof to the lower end portion of support member 18, and tie bar 24 extends forwardly therefrom and is fixedly secured to the frame 11 of tractor 10. Tie bar 24 substantially precludes turning of support member 18 and bracket 19 about the axle housing 15 of tractor 10.

A frame member 20 is removably mounted on each of the support members 18 and may be constructed of channel iron of such size to be readily inserted into the interior chamber 18d of support member 18. The side walls 18b of support member 18 comprise guide elements for restricting transverse movement of frame member 20. Each of the frame members 20 has a pair of aligned apertures 20a positioned in the opposite side walls thereof to be aligned with apertures 18e in support member 18 when assembled therewith. Pins 21 are provided to be inserted through the apertures 18e and 20a of support members 18 and frame members 20 respectively to lock the same in fixed relation when assembled. Each of the pins 21 has a laterally extending arm 21a secured thereto. A clip 22 is provided on each of the support members 18 adjacent to one of the apertures 18e thereof for engaging and retaining arm 21a of pin 21 in position.

A socket element member 23 comprising engaging means, is secured on the exterior of each of the frame members 20 and, in the form shown, comprises a short length of channel iron defining a downwardly opening interior chamber 23a of such size to receive the upper end portion 18a of support member 18 therein. Each of the channel members 23 includes an inwardly extending flange 23b at the upper portion thereof which is attached as by welding to frame member 20 and which provides a stop member with a downwardly facing supporting surface engaging the upwardly facing top surface of support member 18 when the same is inserted in interior chamber 23a.

A pair of hoisting booms 25 are provided as a portion of the attachment 17 and are constructed of a rigid tubular material such as steel conduit. The rear end portion 25a of each of the booms 25 is swingably attached to the upper end portion of the respective frame member 20 to permit booms 25 to swing in a vertical plane. In the form shown, a loading bucket 27 is swingably mounted between the forward end portions 25b of booms 25. A suitable latching mechanism 28 is provided for bucket 27 to hold the same in a substantially horizontal position when latched and to permit bucket 27 to tilt when released. Latching mechanism 28 is provided with a tie rod 28a extending rearwardly along one of the booms 25 to a shiftably mounted latch-control arm 28b which is positioned adjacent to the rear end portion 25a of boom 25.

Stiffening members 29 and 30 are fixedly secured to each of the booms 25 as by welding. When the booms 25 are in lowered position, stiffening members 29 extend in a substantially horizontal direction and are attached to the forward end portions 25b of booms 25, and stiffening members 30 extend in a substantially vertical direction and are secured to the medial portion of boom 25.

Stiffening members 29 and 30, which are rigidly interconnected, shift upwardly and downwardly with booms 25 and essentially comprise a portion thereof. Means are provided in attachment 17 for raising and lowering the booms 17.

A hydraulic cylinder 31 which comprises a controllably extendable and retractable member, is swingably mounted to the lower end portion of each of the frame members 20 as by pivot 32.

Each of the hydraulic cylinders 31 includes a shiftable plunger rod 31a which is pivotally attached to the rear end portion of the respective stiffening member 29 and is thereby associated with boom 25 for raising and lowering the same. Hydraulic pressure lines 31b and 31c communicate with the opposite end portions of each of the hydraulic cylinders 31, and each of the lines 31b and 31c communicate with a hydraulic pressure pump (not shown) which may be mounted on and powered by tractor 10.

A depending supporting leg 33, having a base plate 34 secured to the lower end thereof, is associated with each of the booms 25 for supporting the same. In the form shown, each of the legs 33 is swingably mounted in a supporting plate 35 as by removable pivot pin 36. Plate 35 is fixedly secured as by welding to the stiffening members 29 and 30 adjacent to the interconnection therebetween. Each of the supporting legs 33 is positioned rearwardly of the balance point or center of gravity of the combined hoisting structure including frame 20, boom 25, bucket 27, stiffening members 29 and 30 and hydraulic cylinder 31. Legs 34 may be detached from supporting plate 35 and may be hung on hooks 37 for storage.

In operation, the hoisting attachment 17 will be attached to the tractor substantially as shown in Figs. 1 and 2. By operation of hydraulic cylinder 31, plunger rod 31a will be extended as shown in dotted position B to hoist the forward end portion 25b of boom 25 and bucket 27 into an elevated position.

When it is desired to detach the hoisting equipment from the tractor, the boom 25 and bucket 27 are lowered to a position wherein bucket 27 is slightly above the ground, substantially as shown in the full lines of Fig. 1. Legs 34 will be swung downwardly substantially as shown and pin 21 is removed from support members 18 and frame members 20. The removal of pressure from hydraulic cylinders 31 causes booms 25 to shift downwardly which causes legs 33 to engage the ground to provide a fulcrum and which causes the forward end portions 25b of booms 25 and bucket 27 to tilt forwardly to thereby raise the rear end portions 25a of booms 25 and the respective frame members 20. Upward shifting of frame member 20 and a corresponding upward shifting of socket member 23 causes disengagement of the upper end portion 18a of support member 18 from socket member 23. The hoisting apparatus is thereupon completely detached from tractor 10, except for pressure lines 31b and 31c which of course may be readily and easily disconnected.

When the hoisting apparatus is disconnected from tractor 10 it will be supported by bucket 27 and by the laterally disposed legs 33. Attachment of the apparatus to the tractor is accomplished by driving the front wheels 14 of tractor 10 between the spaced apart booms 25 to bring support members 18, which are attached to tractor 10, into proximity with frame members 20 of the hoisting apparatus. The tractor must be positioned to align the forwardly opening interior chambers 18d of support members 18 with the upstanding frame members 20 of the hoisting apparatus. Because the detached hoisting apparatus is tilted slightly forward, socket members 23 are in slightly elevated position with reference to the upper end portions 18a of each of the support members 18 being shifted into proximity therewith. With forward movement of tractor 10, support members 18a will shift into surrounding relation with frame members 20 and will engage the same. By producing additional forward movement of support members 18, the complete hoisting apparatus 17 is shifted slightly forwardly and is pushed off legs 34 which will swing rearwardly with respect to booms 25. Frame members 20 will then drop downwardly to cause socket member 23 to engage and receive the upper end portion 18a of support member 18 in the interior chamber 23a thereof. Pin 21 will then be inserted through the aligned apertures 18e and 20a of support members 18 and frame members 20 respectively to lock the hoisting apparatus in operating position. Pressure line 31b and 31c may then be connected with the source of hydraulic pressure, and legs 33 may be retracted and moved to hang on hooks 37.

It will, of course, be understood that various changes may be made in the form, detail, arrangement and proportion of the parts without departing from the scope of my invention which consists of the matter described herein and set forth in the appended claims.

What I claim is:

1. For use in hoisting an implement, the combination of a tractor having a frame and having a forward end portion, an upstanding channel member fixedly secured to said tractor and having an upper end portion and having side walls and a rear wall defining a forwardly opening interior chamber, a frame member engaging said channel member and being inserted into the interior chamber thereof, said frame member having a socket member thereon defining a downwardly opening chamber removably receiving the upper end portion of said channel member therein, a boom swingably mounted on said frame member to shift in a vertical plane and having a forward end portion adapted to have such an implement secured thereto, and a controllably extendable and retractable member connected to said tractor and swingably connected to said frame member and said boom to effect raising and lowering thereof.

2. For readily attaching and detaching a hoisting implement, the combination of a tractor having a frame, an upstanding channel member fixedly secured to the frame of said tractor and having a rear wall and side walls defining a forwardly opening interior chamber, said channel member having an upper end portion, a frame member engaging said channel member and being inserted into the interior chamber thereof, said frame member having a socket member thereon defining a downwardly opening interior chamber releasably receiving the upper end portion of said channel member therein, an elongated boom having a rear end portion swingably secured to said frame member to swing in a vertical plane and having a forward end portion adapted to have such an implement attached thereto, a depending support leg shiftably secured to said boom and positioned adjacent to the medial portion thereof, and a controllably extendable and retractable member secured to said frame member and engaging said boom for raising and lowering the same.

3. For carrying and hoisting an implement such as a bucket-type loader, the combination of a tractor including a frame having rear axle housings extending outwardly from opposite sides thereof, a pair of upstanding channel members fixedly secured to said axle housings on opposite sides of said tractor, each of said channel members defining a forwardly opening interior chamber and having an upper end portion, a pair of frame members, each engaging one of said channel members and being inserted into the interior chamber thereof, a pair of socket members each comprising a channel fixedly secured to one of said frame members and having side walls and a rear wall positioned in spaced relation with said frame member and defining a downwardly opening socket chamber releasably retaining the upper end portion of the respective channel member therein, a pair of elongated booms each having a rear end portion pivotally mounted on said frame member to swing in a vertical plane and having a forwardly extending front end portion adapted to be secured to such an implement, a pair of hydraulic cylinders each connected to one of said frame members and to the respective boom for controllably raising and lowering the same, and a pair of depending supporting legs, each swingably mounted on one of said booms and positioned adjacent the medial portion, whereby when said implement is attached to said booms, lowering of said booms causes said legs to engage the ground to form a fulcrum about which the boom tilts to lower the implement to the ground and to raise said frame members and said socket members and effectuate detachment thereof from said channel members, and whereby said tractor may be moved forwardly to cause said channel members to engage said frame members and receive the same in the interior chambers thereof and said tractor may be further moved forwardly to push said boom off the support legs and to thereby cause socket members to drop into engagement with the upper end portion of said channel members to effect attachment of the frame member and boom to the tractor.

4. A readily attachable and detachable attachment for tractors, said attachment comprising a hoistable implement to be disposed at one end of the tractor, a pair of spaced hoist assemblies disposed on opposite sides of the tractor, each of said hoist assemblies including a boom extending longitudinally of the tractor, said boom having a rear portion and also having a forward portion secured to said implement, an elongated upright frame member, a pivotal connection between said frame member and the rear portion of said boom, operable lift mechanism swingably connected with said boom intermediate the forward and rear portions thereof and swingably connected with said upright frame member in vertically spaced relation with said pivotal connection whereby to effect relative vertical swinging of said boom and said frame member when said lift mechanism is operated, said frame member having a rearwardly facing engaging surface and having upper and lower ends, means for removably mounting said frame member on the tractor and including an elongated upright support member having upper and lower ends and having a forwardly facing engaging surface bearing against the rearwardly facing surface of said frame member, said support member supporting said frame member, one of said members having at a distance above the lower end thereof a socket element, the other of said members having at a distance above the lower end thereof an insert element, said socket element having spaced, interior, forwardly facing and rearwardly spacing retaining surfaces defining a vertically opening interior chamber receiving said insert element therein and restricting relative rearward and forward movement of said insert and socket elements relative to each other, said insert and socket elements being constructed and arranged to facilitate releasing of said frame member from said support member when the frame member is raised, whereby the hoisting attachment may be readily and easily mounted on and removed from the tractor, by raising said frame member.

5. For use with a tractor having a fore-and-aft body including a transversely projecting rear axle portion: an implement mounting attachment comprising a pair of upright rigid supporting elements mounted adjacent to one another on the axle and implement respectively, the element on the axle being rigidly affixed thereto, and one of said elements having a vertically disposed notch therein and an aperture spaced from the notch, the other of said elements having a rigid extending portion adapted to engage the aforesaid notch upon the application of downward pressure of the implement on the tractor thereby causing the rigid portion to be seated in the notch and an aperture registerable with the aperture of said one element upon the rigid portion being seated in the notch; and releasable fastener means receivable in the registered apertures to prevent separation of the elements.

6. For use with a tractor having a fore-and-aft body including a transversely extending rear axle portion; a mounting attachment for an implement of the type having working mechanism disposed outwardly of one end of the tractor and having longitudinal arm structures at each side of the tractor for interconnecting said working mechanism with the rear portion of the tractor, said mounting attachment comprising a pair of upstanding support members secured on opposite sides of the tractor frame adjacent said axle, a pair of elongate frame members each secured to one of said arm structures and each constructed to be positioned vertically against one of said support members, coupling means between each support member and the associated frame member and comprising cooperating interlocking elements on said frame member and on the upper end portion of said support member respectively, said cooperating elements being interlockably engageable and disengageable in limited downward and upward movements respectively of said frame members relative to said support members, additional interlocking mechanism spaced from said coupling means for interlocking said related support and frame members together against vertical displacement, and cooperating means between said support members and their associated frame members for preventing relative lateral displacement of said members when coupled.

7. A loader-type implement attachable to and detachable from a tractor by moving the longitudinal arm structures in a fore-and-aft rocking motion, said implement having in combination a pair of longitudinal arm structures each disposed along one side of the tractor for supporting a working mechanism outwardly of one end of the tractor, a pair of mounting attachments for securing the inner ends of the arm structures to the tractor, each of said mounting attachments comprising a pair of upright rigid supporting elements mounted adjacent to one another on the tractor and the inner end of the arm structure respectively and constructed to be positioned vertically against one another, the element on the tractor being rigidly affixed thereto, said supporting elements having cooperating interlocking portions interlockably engageable and disengageable in limited downward and upward movements respectively of the arm structure with respect to the tractor, the supporting element on the tractor having its interlocking portion disposed adjacent the upper end thereof, additional interlocking mechanism spaced from said portions for interlocking said supporting elements together against vertical displacement, cooperating means between said supporting elements for preventing relative lateral displacement of said elements when coupled together, and a pair of depending supporting legs each on a respective arm structure intermediate the inner and outer ends thereof and in supporting relation with said inner end, said legs permitting rocking of the arm structures when the pair of supporting elements of each mounting attachment are disposed in abutting relation to drop the supporting elements attached to the arm structures relative to the supporting elements attached to the tractor and effect interengagement of said interlocking portions of the supporting elements.

8. A loader-type implement attachable to a tractor by driving the tractor between and longitudinally moving the arm structures of the implement, said implement having in combination a pair of longitudinal arm structures each disposed along one side of the tractor for supporting a working mechanism outwardly of one end of the tractor, a pair of mounting attachments for securing the inner ends of the arm structures to the tractor, each of said mounting attachments comprising a pair of upright rigid supporting elements mounted adjacent to one another on the tractor and the inner end of the arm structure respectively and constructed to be positioned vertically against one another, the element on the tractor being rigidly affixed thereto, said supporting elements having cooperating interlocking portions interlockably engageable and disengageable in limited downward and upward movements respectively of the arm structure with respect to the tractor, the supporting element on the tractor having its interlocking portion disposed adjacent the upper end thereof, additional interlocking mechanism spaced from said portions for interlocking said support elements together against vertical displacement, cooperating means between said supporting elements for preventing relative lateral displacement of said elements when coupled together, a pair of depending supporting legs each swingably mounted on a respective arm structure for fore-and-aft swinging movement and in supporting relation with said inner end, said legs swinging to drop the inner ends of the arm structures and the supporting elements thereon relative to the supporting elements on the tractor and effect engagement of said interlocking portions of the supporting elements when the pair of supporting elements of each mounting attachment are disposed in abutting relation and when the arm structures and working mechanism are moved longitudinally by the tractor.

9. For use with a tractor having a fore-and-aft body including a transversely extending axle portion; a mounting attachment for an implement of the type having working mechanism disposed outwardly of one end of the tractor and having longitudinal arm structures at each side of the tractor for interconnecting said working mechanism with the rear portion of the tractor, said mounting attachment comprising a pair of upstanding support members secured on opposite sides of the tractor adjacent said axle, a pair of elongate frame members each secured to one of said arm structures and each constructed to be positioned vertically against one of said support members, one of said pairs of members being channel-shaped for receiving the other of said members therein and restricting relative movement thereof transversely of the tractor, means on the frame members defining downwardly opening socket chambers releasably receiving the upper end portions of said support members therein and constructed to support the frame members on the support members, and interlocking mechanism spaced from the upper end of said support members for interlocking said related support and frame members together against vertical displacement.

References Cited in the file of this patent
UNITED STATES PATENTS

| | | |
|---|---|---|
| 2,417,560 | McNamara | Mar. 18, 1947 |
| 2,535,727 | Dingley | Dec. 26, 1950 |
| 2,554,198 | Kuhlman | May 22, 1951 |
| 2,614,712 | Dingley | Oct. 21, 1952 |
| 2,627,989 | Chaves | Feb. 10, 1953 |
| 2,630,231 | Klinge | Mar. 3, 1953 |
| 2,632,575 | Geraldson | Mar. 24, 1953 |